(12) United States Patent
Gaither et al.

(10) Patent No.: US 8,670,971 B2
(45) Date of Patent: Mar. 11, 2014

(54) DATACENTER WORKLOAD EVALUATION

(75) Inventors: Blaine D. Gaither, Fort Collins, CO (US); Bret A. McKee, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1704 days.

(21) Appl. No.: 11/831,556

(22) Filed: Jul. 31, 2007

(65) Prior Publication Data

US 2009/0037164 A1 Feb. 5, 2009

(51) Int. Cl.
| | |
|---|---|
| *G06F 9/44* | (2006.01) |
| *G06F 13/10* | (2006.01) |
| *G06F 13/12* | (2006.01) |
| *G06F 15/16* | (2006.01) |
| *G06F 11/00* | (2006.01) |
| *G06F 9/455* | (2006.01) |
| *G06F 9/46* | (2006.01) |

(52) U.S. Cl.
USPC ............... 703/21; 709/201; 714/4; 717/170; 718/1; 718/105

(58) Field of Classification Search
USPC ......... 703/21; 718/105, 1; 715/715; 709/201; 714/4; 717/170
See application file for complete search history.

(56) References Cited

U.S. PATENT DOCUMENTS

| 7,092,985 B2 * | 8/2006 | Hubbard ..................... 709/201 |
| 7,640,342 B1 * | 12/2009 | Aharoni et al. ............... 709/226 |
| 2003/0163608 A1 * | 8/2003 | Tiwary et al. .................... 710/1 |
| 2005/0232192 A1 | 10/2005 | Rawson |
| 2005/0289540 A1 * | 12/2005 | Nguyen et al. .................... 718/1 |
| 2006/0143495 A1 * | 6/2006 | Bozak et al. ...................... 714/4 |
| 2006/0161884 A1 * | 7/2006 | Lubrecht et al. ............... 717/104 |
| 2006/0265449 A1 | 11/2006 | Uemura et al. |
| 2006/0282825 A1 | 12/2006 | Taylor |
| 2007/0204266 A1 * | 8/2007 | Beaty et al. ....................... 718/1 |
| 2007/0250615 A1 * | 10/2007 | Hillier ........................... 709/223 |
| 2007/0250838 A1 * | 10/2007 | Belady et al. ................. 718/105 |
| 2008/0077366 A1 * | 3/2008 | Neuse et al. ..................... 703/2 |
| 2008/0104608 A1 * | 5/2008 | Hyser et al. ................... 718/105 |
| 2008/0104609 A1 * | 5/2008 | D'Amora et al. ............. 718/106 |
| 2008/0271017 A1 * | 10/2008 | Herington ......................... 718/1 |

OTHER PUBLICATIONS

Dan Herington and Bryan Jacquot, "The HP Virtual Server Environment: Making the Adaptive Enterprise Vision a Reality in Your Datacenter", 2005, Chapter 17-18.*

Christopher Clark, Keir Fraser, Steven Hand, Jacob Gorm Hansen, Eric Jul, Christian Limpach, Ian Pratt, Andrew Warfield, "Live migration of virtual machines", Proceedings of the 2nd conference on Symposium on Networked Systems Design & Implementation—vol. 2, pp. 273-286, 2005.*

(Continued)

*Primary Examiner* — Omar Fernandez Rivas
*Assistant Examiner* — Angel Calle

(57) ABSTRACT

A method is provided for evaluating workload consolidation on a computer located in a datacenter. The method comprises inflating a balloon workload on a first computer that simulates a consolidation workload of a workload originating on the first computer and a workload originating on a second computer. The method further comprises evaluating the quality of service on the first computer's workload during the inflating and transferring the workload originating on either the first or the second computer to the other of the first or second computer if the evaluating the quality of service remains above a threshold.

22 Claims, 6 Drawing Sheets

(56) References Cited

OTHER PUBLICATIONS

S. Ranjan, J. Rolia, H. Fu, and E. Knightly, "QoS-Driven Server Migrationfor Internet Data Centers", In Proceedings of IWQoS, 2002.*

Michael R. Marty and Mark D. Hill, "Virtual Hierarchies to Support Server Consolidation", Jun. 2007.*

Dan herington and Bryan Jacquot, "The HP Virtual Server Environment: Making the Adaptive Enterprise Vision a Reality in Your Datacenter", Chapter 17 and 18, 2005.*

Amy Spellmann, Karen Erickson and Jim Reynolds, "Server Consolidation Using Performance Modeling", IEEE, 2003.*

Christopher Clark, Keir Fraser, Steven Hand, Jacob Gorm Hansen, "Live Migration of Virtual Machines", 2005.*

* cited by examiner

DATACENTER WORKLOAD EVALUATION

BACKGROUND

Datacenters with several servers or computers having variable workloads may wish to consolidate workloads by transferring a workload from one machine (the migrating machine) to a second machine (the destination machine) having a preexisting workload. The decision to consolidate the workloads onto the destination machine may be based upon any number of reasons, including for example, a desire to save power, relocate the workload to an area in the datacenter offering better cooling or ventilation, a desire to move the workload from an under utilized machine to a more utilized machine, to reduce cost on leased hardware, or to reduce cost on licensed software.

When consolidating workloads onto a destination machine, it is difficult to predict the impact in the quality of service (QOS) on the computer or server receiving the additional workload. Current methods for determining workload transference simply "add-up" the resources (e.g., CPU, Memory, and IO) demanded by the resources used between the target and migrating machines. Such approach however does not account for conflicts that can arise that would prevent the new and existing workloads from working well together on a single machine. Interferences often arise at some level between the additional and existing workloads that cannot be accounted for by the current additive methods for evaluating workload transference. As such, the QOS is compromised and the workload is typically transferred back from the destination machine to the migrating machine, incurring both costs and time as a result to the datacenter.

DETAILED DESCRIPTION

Figure 1:
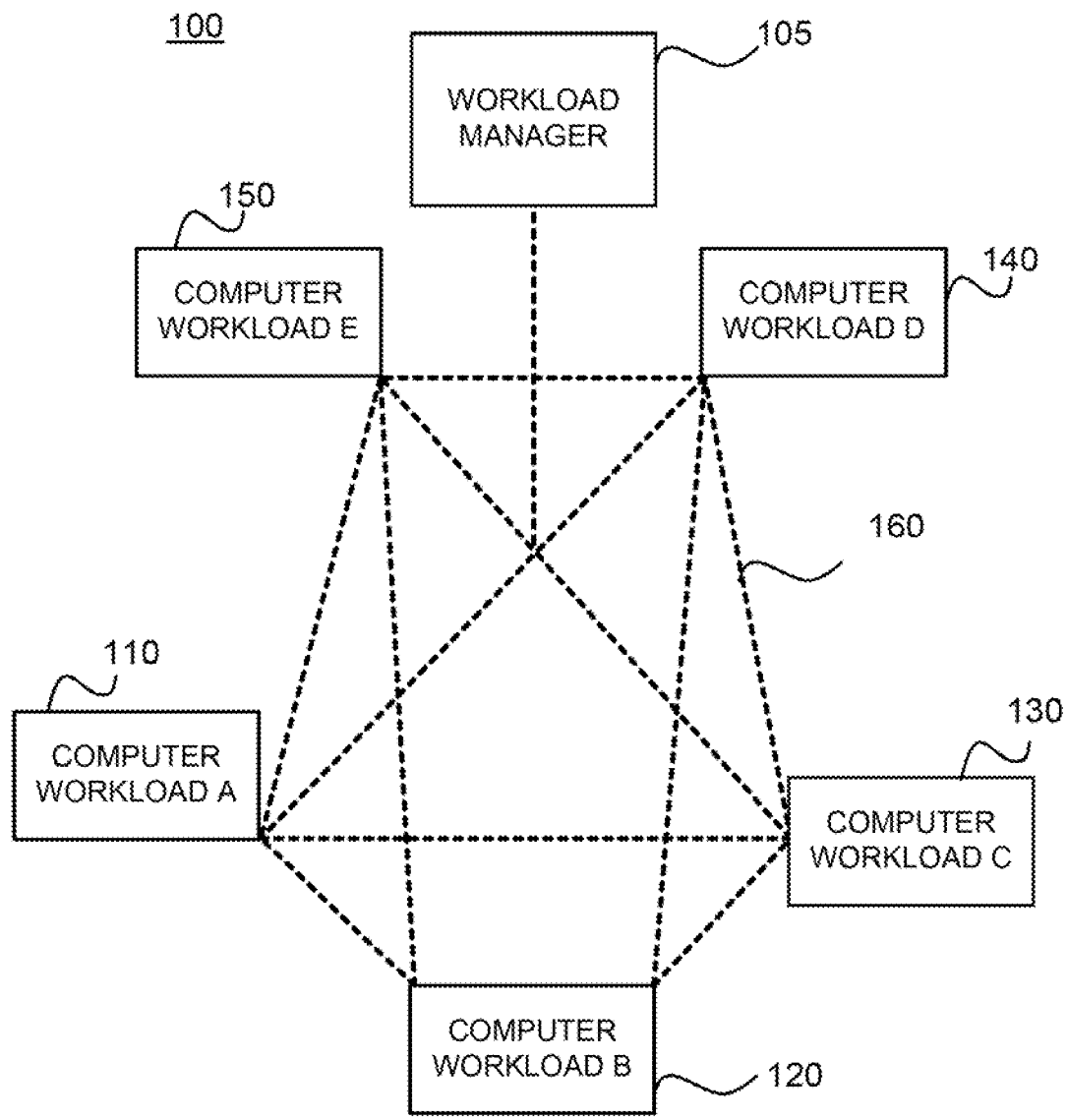
FIG. 1 illustrates one example embodiment of a datacenter structured for workload evaluation.

With reference now to the figures, and in particular with reference to FIG. 1, there is depicted a datacenter 100 utilizing workload evaluation management through workload manager 105 between a plurality of computers 110-150. The workload manager 105 can be a stand alone component or distributed among the plurality of computers 110-150 in the datacenter 100. The workload manager 105 employs a management program that automatically optimizes the datacenter's operations. The optimization by the workload manager 105 management program may seek to improve in the datacenter for example, performance, reduce power consumption, reduce cooling problems, allow for maintenance, avoid failing hardware, or any other goal set.

The workload evaluation management through the workload manager 105 program simulates a consolidation workload without actually moving a workload. The consolidated workload simulation occurs on a computer targeted for workload transfer (the migration computer) in order to evaluate whether the quality of service (QOS) (e.g., utilization of memory, IO, CPU resources) is acceptable if the consolidation were to occur on a computer targeted for workload consolidation (the destination computer). In addition, the workload manager 105 program can be expanded to simulate the impact of the QOS in the transfer of the workload. If the workload manager 105 determines that the QOS in either of the consolidated workload simulations is not acceptable, i.e., the resulting utilization of resources (e.g., memory, IO, or CPU) was too low in the migration computer (indicating a decline of QOS in the migration workload) as a result of the simulated consolidation or transfer, the transfer of the workload and consolidation to the destination computer is avoided. The cost savings relating to the consolidation avoidance saves not only time and expense of transferring the workload errantly to the destination computer, but also provides savings by avoiding transferring the workload back to the migration computer. In a similar fashion, the impact of migration of a workload migration on the destination computer can be determined by running a balloon workload on the destination computer simulating the additional load to be imposed by the migrating workload.

Referring again to FIG. 1, the computers 110-150 are in communication with each other by wired or wireless communication links 160. While the term computers is being used throughout, it is intended that the term is, and remains synonymous with central processing units (CPUs), workstations, servers, and the like and is intended throughout to encompass any and all of the examples referring to computers discussed herein and shown in each of the figures.

Figure 2:
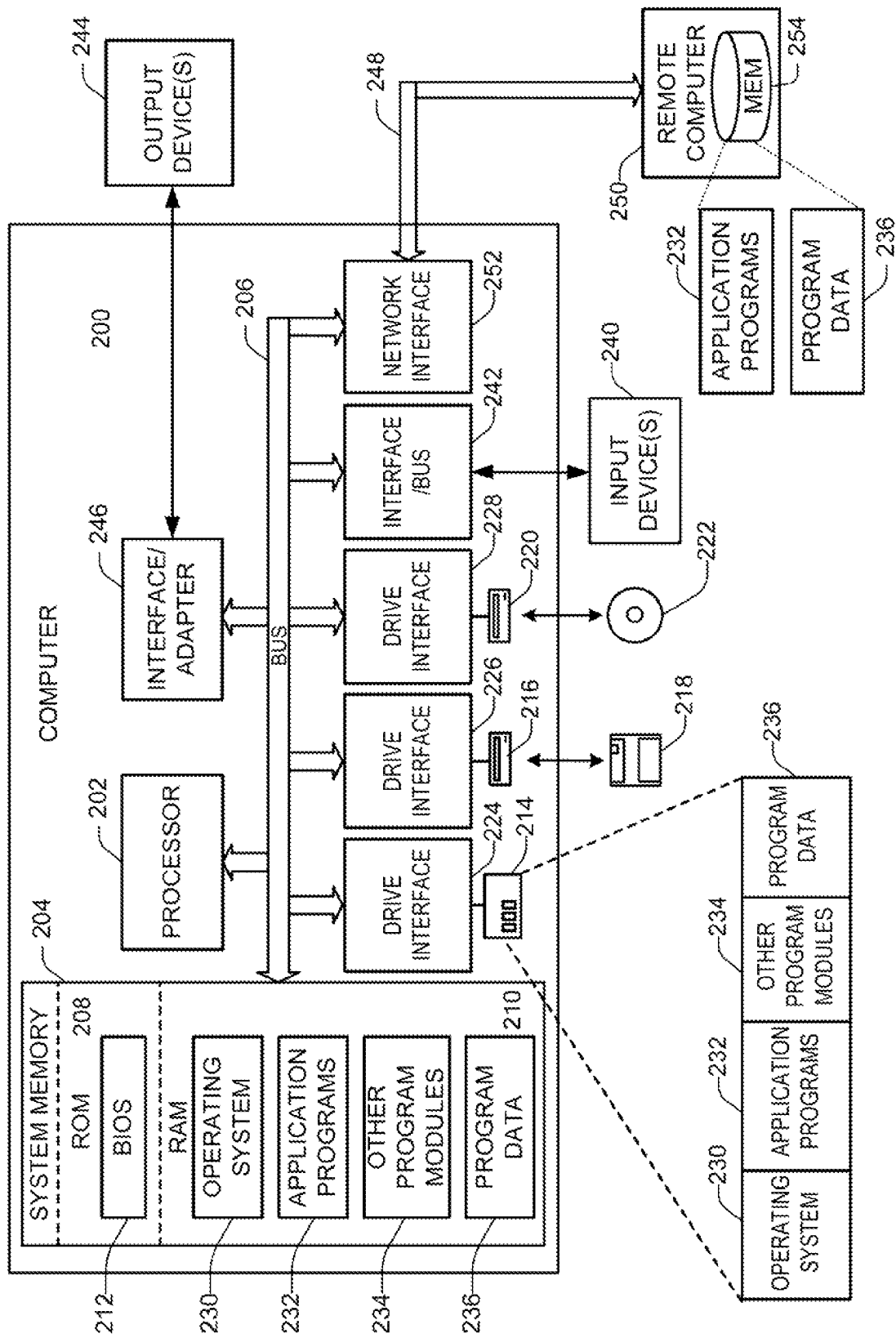
FIG. 2 illustrates an example embodiment of a general purpose computer system.

FIG. 2 illustrates in more detail, any one or all of the plurality of computers 110-150 in an example of an individual computer system 200 that can be employed to implement systems and methods described herein, such as based on computer executable instructions running on the computer system. The computer system 200 can be implemented on one or more general purpose networked computer systems, embedded computer systems, routers, switches, server devices, client devices, various intermediate devices/nodes and/or stand alone computer systems. Additionally, the computer system 200 can be implemented as part of a network analyzer or associated design tool running computer executable instructions to perform methods and functions, as described herein.

The computer system 200 includes a processor 202 and a system memory 204. A system bus 206 couples various system components, including the system memory 204 to the processor 202. Dual microprocessors and other multi-processor architectures can also be utilized as the processor 202. The system bus 206 can be implemented as any of several types of bus structures, including a memory bus or memory controller, a peripheral bus, and a local bus using any of a variety of bus architectures. The system memory 204 includes read only memory (ROM) 208 and random access memory (RAM) 210. A basic input/output system (BIOS) 212 can reside in the ROM 208, generally containing the basic routines that help to transfer information between elements within the computer system 200, such as a reset or power-up.

The computer system 200 can include a hard disk drive 214, a magnetic disk drive 216, e.g., to read from or write to a removable disk 218, and an optical disk drive 220, e.g., for reading a CD-ROM or DVD disk 222 or to read from or write to other optical media. The hard disk drive 214, magnetic disk drive 216, and optical disk drive 220 are connected to the system bus 206 by a hard disk drive interface 224, a magnetic disk drive interface 226, and an optical drive interface 228, respectively. The drives and their associated computer-readable media provide nonvolatile storage of data, data structures, and computer-executable instructions for the computer system 200. Although the description of computer-readable media above refers to a hard disk, a removable magnetic disk and a CD, other types of media which are readable by a computer, may also be used. For example, computer executable instructions for implementing systems and methods described herein may also be stored in magnetic cassettes, flash memory cards, digital video disks and the like. A number of program modules may also be stored in one or more of the drives as well as in the RAM 210, including an operating system 230, one or more application programs 232, other program modules 234, and program data 236.

A user may enter commands and information into the computer system 200 through user input device 240, such as a keyboard, a pointing device (e.g., a mouse). Other input devices may include a microphone, a joystick, a game pad, a scanner, a touch screen, or the like. These and other input devices are often connected to the processor 202 through a corresponding interface or bus 242 that is coupled to the system bus 206. Such input devices can alternatively be connected to the system bus 206 by other interfaces, such as a parallel port, a serial port or a universal serial bus (USB). One or more output device(s) 244, such as a visual display device or printer, can also be connected to the system bus 206 via an interface or adapter 246.

The computer system 200 may operate in a networked environment using logical connections 248 (representative of the communication links 160 in FIG. 1) to one or more remote computers 250 (representative of any of the plurality of computers 110-150 in FIG. 1). The remote computer 250 may be a workstation, a computer system, a router, a peer device or other common network node, and typically includes many or all of the elements described relative to the computer system 200. The logical connections 248 can include a local area network (LAN) and a wide area network (WAN).

When used in a LAN networking environment, the computer system 200 can be connected to a local network through a network interface 252. When used in a WAN networking environment, the computer system 200 can include a modem (not shown), or can be connected to a communications server via a LAN. In a networked environment, application programs 232 and program data 236 depicted relative to the computer system 200, or portions thereof, may be stored in memory 254 of the remote computer 250.

Each of the computer systems 200 in the plurality of computers 110-150 of the datacenter 100 may be running different or similar operating systems and/or applications. Further, each of the computers 110-150 may include a workload varying in size. For example, computers 110 and 150 include Workload A and Workload E, respectively acting as web servers, computer 130 includes Workload C acting as a print server, and computer 120 includes Workload B acting as an application server.

Figure 3:
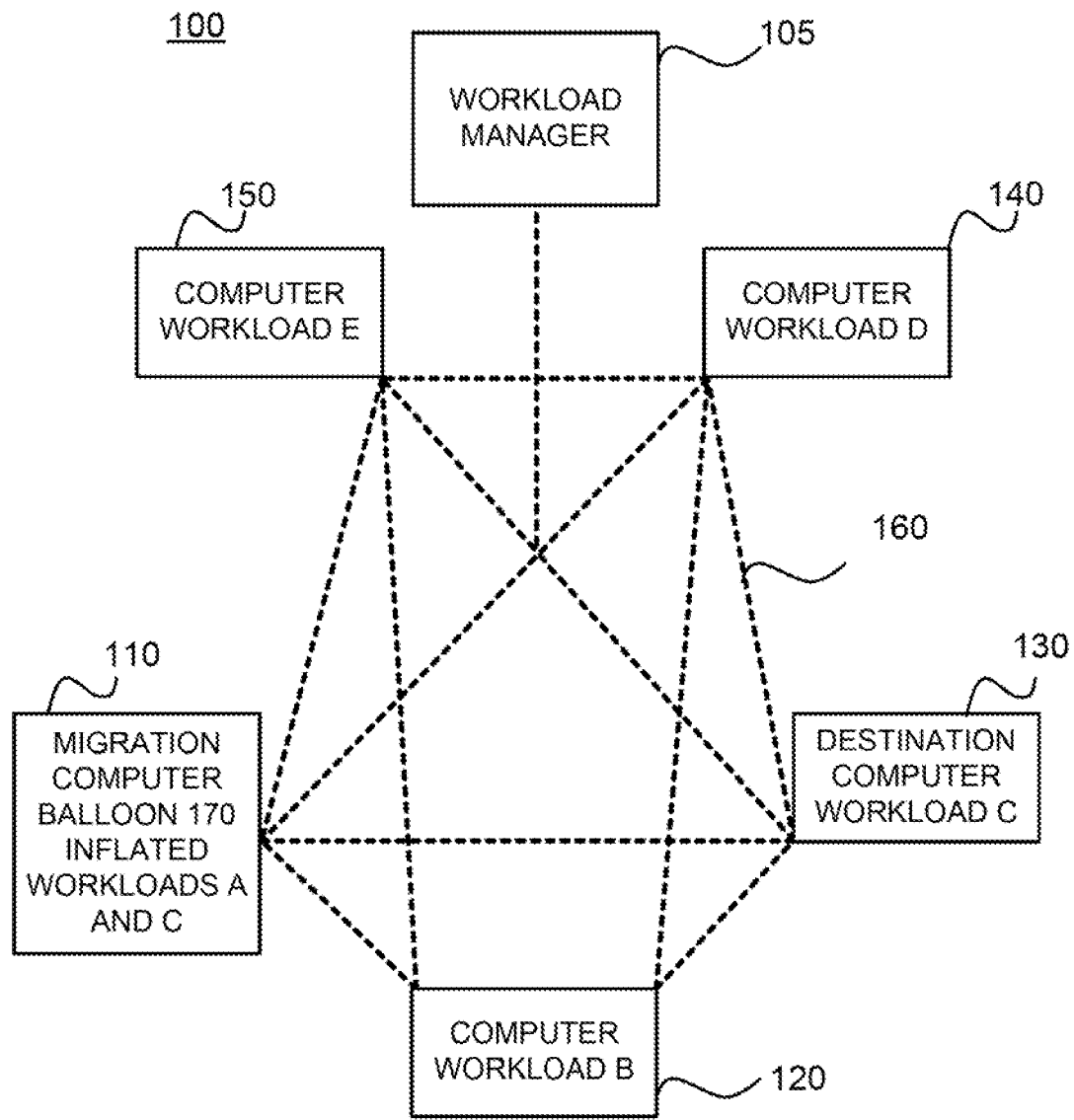
FIG. 3 illustrates the example embodiment of FIG. 1 in which a workload in a migrating computer is evaluated for consolidating with a workload on a destination computer.

Once the migration and destination computers are targeted, the workload evaluation management employs the workload manager 105 program to inflate a balloon workload 170 on the migration computer. The inflated balloon workload 170 simulates a consolidated workload that includes a workload originating on a target migration computer with a simulated workload modeling a workload running on a target destination computer without having to transfer any of the workloads from the migration or destination computers. FIG. 3 illustrates such an example that comprises a consolidated workload that includes both workload A (that originated in the targeted migrating computer 110) and a balloon workload 170 simulating the addition of workload C currently on the destination computer 130. Concurrently, the destination computer 130 continues to process workload C without interruption from the simulation occurring by the balloon workload 170 on migration computer 110.

The balloon workload 170 mimics the workload C that is already running on the destination computer 130, if consolidation occurs, by the use of parameters sent by the workload manager 105 for workload C. The balloon workload 170 uses the resources (e.g., CPU, memory, IO) in the migration computer 110 to mimic the resource consumption to be used in the destination computer 130 by workload C. The parameters sent to the balloon workload 170 by the workload manager 105 account for the differences in utilization, speeds, and bandwidth of the migration and destination computers, 110, 130, respectively. In addition, the balloon workload 170 includes parameters that are established by the workload manager 105 to accept the destination computer's demand rate for important resource classes.

The balloon workload 170 originates on each of the computers 110-150 in the datacenter 100 where it remains deflated until instructed to inflate i.e., an execution command is initiated by the workload manager 105. Alternatively, the workload manager 105, a remote computer outside the datacenter 100, a computer located within the datacenter, or a computer operator may selectively install or transmit the balloon workload 170 onto the targeted migration computer, where it remains deflated until instructed to inflate by the workload manager. When deflated the balloon workload utilizes minimal resources.

Figure 4:
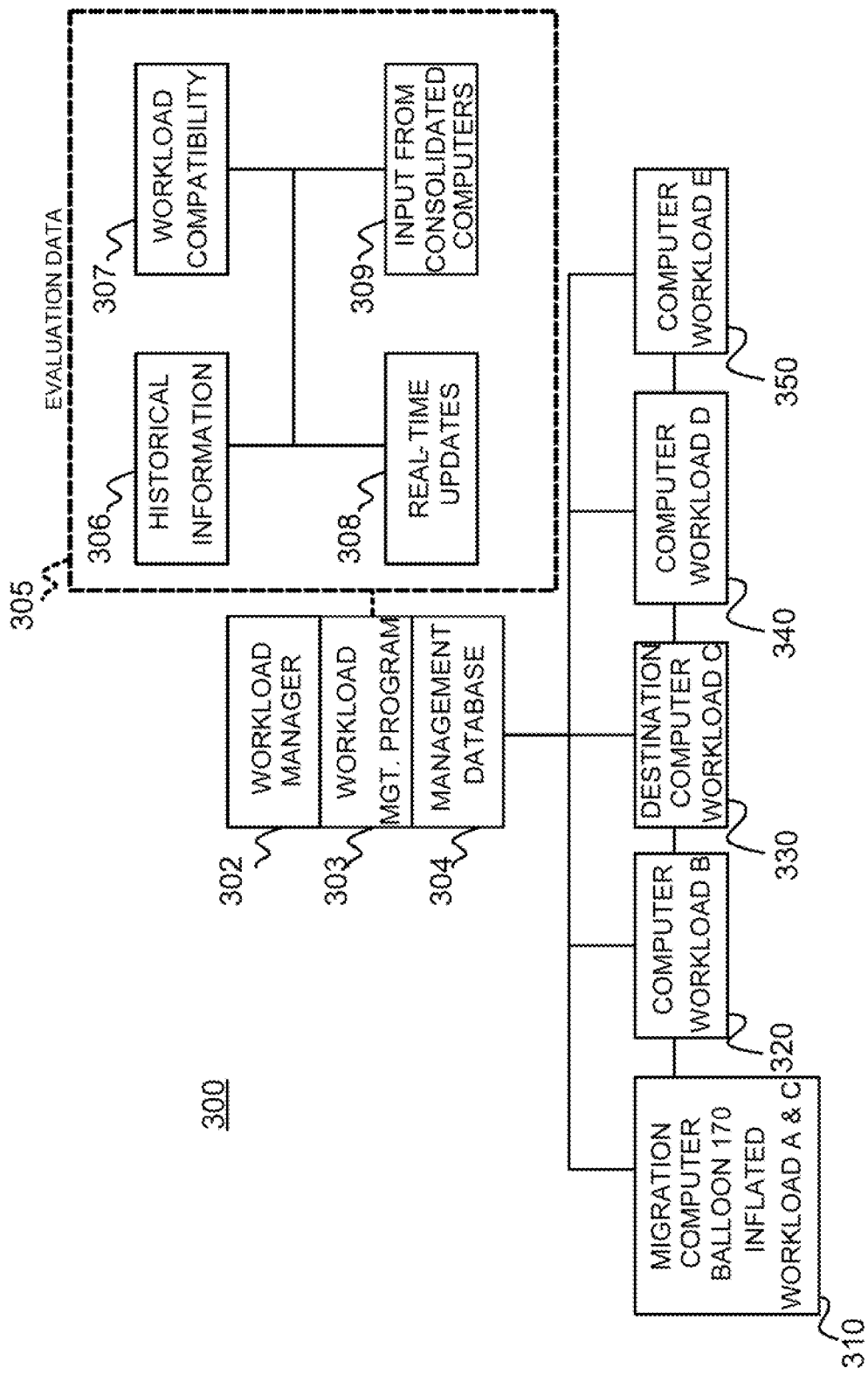
FIG. 4 illustrates an example embodiment of a datacenter structured for workload evaluation.

FIG. 4 illustrates a datacenter 300 employing workload evaluation management led by a workload manager 302. The workload manager includes a workload management program 303 and a management database 304. Once the balloon workload 170 is inflated in the migration computer 310, the workload manager 302 evaluates the migration computer's performance. In particular, the workload manager 302 through its program 303 may look at information internal to the balloon workload 170, the migration workload executable rates, input/output (IO) rates, central processing unit (CPU) execution rates, and the like. Further, the workload manager 302 can simulate and evaluate the impact on the QOS of the actual transference of the workload from the migration computer to the destination computer.

The evaluations of such resources are used by the workload management program 303 to determine whether the workload in the migration computer should be transferred to the destination computer. In the illustrated example of FIG. 4, the evaluations of the resources by the workload management program 303 are performed on migration computer 310 during the balloon workload 170 inflation period. The balloon workload 170, during the inflation period simulates the running of preexisting workload A with workload C found on the target destination computer 330.

If the workload evaluation performed on the migration computer 310 appears to be satisfactory to the workload manager 302, i.e., the resources continue to operate above a threshold that provides an acceptable QOS, the balloon workload 170 deflates instantaneously and workload A is transferred from the migration computer 310 to the destination computer 330 for workload consolidation. The workload transfer may be achieved by many different means, including conventional means such as physically transferring the workload from one computer to another or more modern means such as a migration of guest operating systems from one hypervisor (also referred to as a virtual machine monitor) to another.

If the workload evaluation performed on the migration computer 310 appears to be unsatisfactory to the workload manager 302, i.e., the resources are found to operate below a threshold that provides a less than acceptable QOS, the balloon workload 170 deflates instantaneously and the transfer of the workload A from the migration computer 310 to the destination computer 330 is avoided. By deflating quickly, the interval of time when the migration workloads QOS is perturbed by the experiment is minimized.

The workload manager 302 in its evaluation of the migration computer's resources with the balloon workload 170 inflated may also consult evaluation data 305, which includes historical information 306 of workloads on the computers 310-350 in the datacenter 300 and previous transfer history relating to workload compatibility 307. The workload compatibility 307 is based on historical consolidations compiled automatically or manually by exogenous input. The evaluation data 305 further includes real-time update capability 308, which provides real-time information on balloon workload 170 simulations that are occurring in the datacenter 300 to the historical information 306 and/or workload compatibility 307 databases. Similarly, the evaluation data 305 also includes input capabilities 309 from consolidated computers, providing information relating to efficiencies after consolidation. The information from the input capabilities 309 is used in the historical information 306 and/or workload compatibility 307 databases.

Figure 5:
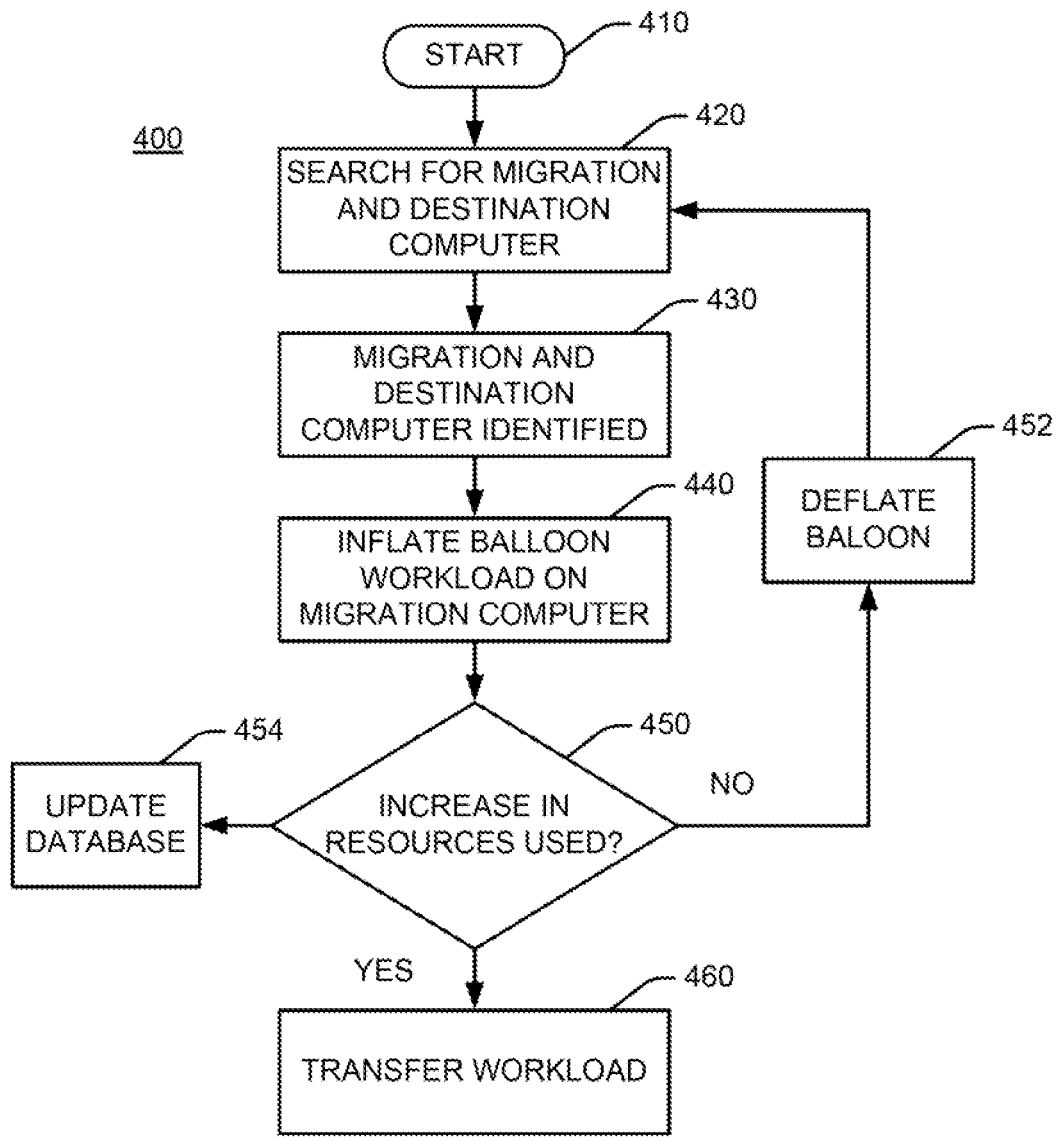
FIG. 5 illustrates a flow diagram of an embodiment employing workload evaluation management for workload consolidation on a destination computer.

FIG. 5 illustrates a flow diagram of a workload evaluation management methodology 400 for determining whether a workload operating in a migrating computer is a viable candidate for consolidation with a different workload operating on a destination computer. The workload evaluation methodology 400 can be generated from computer readable media, such as software or firmware residing in the computer, discrete circuitry such as an application specific integrated circuit (AISC), or any combination thereof.

The methodology starts at 410 wherein a hypervisor, workload manager 302, or human initiates a search for migration and destination computer candidates within the datacenter. At 420, a search for a migration and destination computer is commenced. The search performed at 420 could utilize the evaluation data 305 found in the management database 304 in evaluating potential migration and destination candidates. At 430, migration and destination computers are identified. At 440, a balloon workload is inflated on the migration computer. The balloon workload inflation simulates a consolidation workload, combining the existing workload on the migration computer with a simulated workload found on the destination computer. As such, a new environment is constructed on the migration computer. At 450, an evaluation is made as to whether the throughput declined or resources consumed during the balloon workload inflation increased. Stated another way, an evaluation is made as to whether the QOS threshold was maintained during the balloon simulation. Should direct measurement of the migration workload QOS not be possible the impact on QOS can be inferred from the resource consumption of the migration workload. If resource consumption drops, then it is likely the QOS (throughput or response time) has been adversely impacted. If the result of the evaluation is (NO) that is, the resources consumption decreased on the migration workload a decision is made to avoid the transfer of the workload residing in the migration computer to the destination computer for workload consolidation. At 452, the balloon workload is deflated and a search for a new migration or destination computer occurs. Alternatively, the workload evaluation management methodology 400 may terminate at this point. At 454, the results in the evaluation at 450 are recorded in the management database 304. If the result of the evaluation is (YES) that is, the resources increased or were maintained above a threshold, a decision is made to transfer the workload residing in the migration computer to the destination computer for workload consolidation at 460. An alternative methodology may include yet another step, evaluating the consolidation and QOS at a time period after the consolidation step 460.

Figure 6:
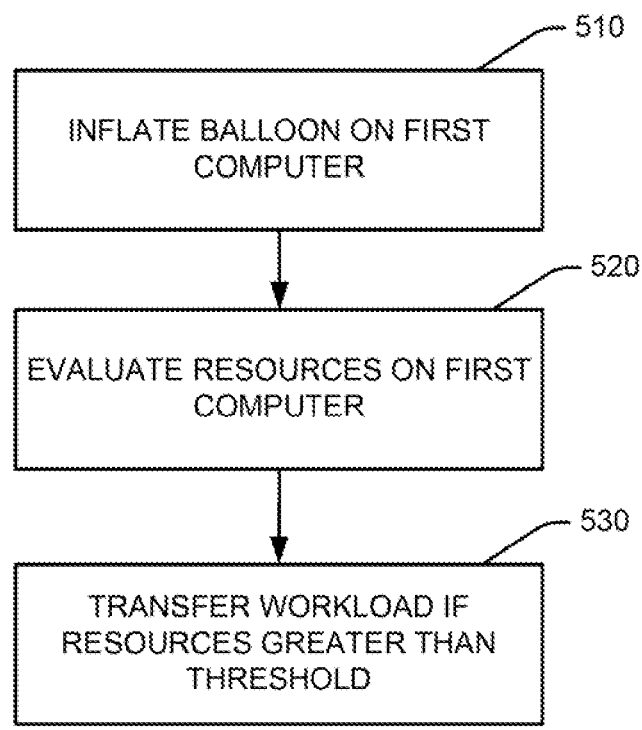
FIG. 6 illustrates a flow diagram of an alternative embodiment employing workload evaluation management for workload consolidation on a destination computer.

FIG. 6 illustrates a flow diagram of a workload evaluation management methodology 500. The methodology 500 is for evaluating workload consolidation on a computer located in a datacenter. At 510, a balloon workload is inflated on a first computer, simulating a consolidation workload of a workload originating on the first computer and a workload originating on a second computer. At 520, an evaluation is made relating to the resources used on the first computer during the inflating. At 530, a transferring the workload originating on either the first or the second computer to the other of the first or second computer occurs if the evaluating of the resources remained above a threshold.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method, comprising:
running a first workload on a first computer;
inflating a balloon workload on the first computer, without interrupting the first workload being run on the first computer, to simulate running a second workload on the first computer with the first workload;
evaluating the quality of service on the first computer during the inflating; and
selectively transferring the first workload from the first computer to a second computer if the quality of service is determined to remain above a threshold.

2. The method of claim 1, wherein the evaluating the quality of service is achieved by observing the resource consumption on the first computer.

3. The method of claim 2, selectively receiving, by the first computer, the second workload from another computer, while the first workload is being run on the first computer, if the quality of service is determined to remain above a threshold.

4. The method of claim 1, further comprising supplying the balloon workload with parameters that account for differences between the first and the second computer.

5. The method of claim 1, further comprising transmitting the balloon workload to the first computer, the balloon workload being deflated until instructions are received from a workload manager to inflate.

6. The method of claim 1, further comprising installing the balloon workload on the first computer, the installed balloon workload remaining deflated until instructions are received from a workload manager to inflate.

7. The method of claim 2, wherein the observing the resource consumption on the first computer during the inflating comprises assessing the first computer's executable rates, input/output rates, and/or central processing execution rates during inflation.

8. The method of claim 2, wherein the observing the resource consumption on the first computer during the inflating comprises simulating resource consumption resulting from transferring the first workload to another computer.

9. The method of claim 2, wherein the observing the resource consumption on the first computer further comprises comparing the resource consumption to historical resource information found in a database.

10. The method of claim 2, wherein the observing the resource consumption on the first computer further comprises comparing the resource consumption to workload compatibility information found in a database.

11. The method of claim 1, further comprising updating a database with real-time information relating to resource utilization for consolidated workloads in computers located in a datacenter corresponding to the first computer.

12. The method of claim 2, wherein the observing the resource consumption on the first computer is performed by a source outside of a datacenter corresponding to the first computer.

13. A system for evaluating workload consolidation on a computer located in a datacenter, the system comprising:
   a first computer that runs a first workload; and
   a second computer that runs a second workload,
   wherein the first computer, while running the first workload, executes a balloon workload that simulates running the second workload together with the first workload;
   wherein a workload manager is executed by at least one computer of the system to evaluate quality of service on the first computer during execution of the balloon workload; and
   wherein, if the evaluated quality of service is above a predetermined threshold, the workload manager selectively transfers the first workload to the second computer so that both the first and second workloads are run on the second computer.

14. The system of claim 13, wherein the quality of service is evaluated by monitoring a performance level of resources during execution of the balloon workload.

15. The system of claim 13, wherein the workload manager provides parameters to the balloon workload to account for differences between the first and the second computer.

16. The system of claim 13, wherein the workload manager accesses a database having historical resource information to determine whether to transfer the first workload to the second computer.

17. The system of claim 13, wherein the workload manager accesses a database having workload compatibility information to determine whether to transfer the first workload to the second computer.

18. The system of claim 16, wherein the database is updated in real-time with resource information from workload consolidation simulations.

19. The system of claim 13, wherein the workload manager is executed by a computer outside of a datacenter corresponding to the first and second computers.

20. A non-transitory computer readable medium having computer executable instructions for performing a method comprising: inflating a balloon workload on a first computer that simulates adding a workload of a second computer to the first computer, wherein the balloon workload does not interrupt an original workload being run on the first computer; evaluating the quality of service on the first computer during the inflating; and selectively transferring the original workload on the first computer to a second computer, if the quality of service remains above a threshold during the inflation of the balloon workload.

21. The non-transitory computer readable medium having computer executable instructions for performing the method of claim 20, wherein the evaluating the quality of service is achieved by observing the resource consumption on the first computer.

22. The non-transitory computer readable medium having computer executable instructions for performing the method of claim 21, wherein the evaluating the quality of service on the first computer during the inflating includes the impact on the quality of service as a result of transferring the original workload from the first computer to the second computer.

* * * * *